United States Patent [19]

Okita et al.

[11] Patent Number: 4,621,027
[45] Date of Patent: Nov. 4, 1986

[54] MAGNETIC RECORDING MEDIUM

[75] Inventors: Tsutomu Okita; Nobuo Tsuji; Yoshito Mukaida; Hiroshi Hashimoto, all of Kanagawa; Teruo Nakagawa, Aichi; Akiyoshi Hashimoto, Aichi; Takahisa Ogasawara, deceased, late of Aichi, all of Japan, by Kuniko Ogasawara, legal representative

[73] Assignee: Fuji Photo Film Co., Ltd., Kanagawa, Japan

[21] Appl. No.: 666,081

[22] Filed: Oct. 29, 1984

[30] Foreign Application Priority Data

Nov. 1, 1983 [JP] Japan ................................. 58-203631

[51] Int. Cl.$^4$ ............................................. G11B 5/70
[52] U.S. Cl. ............................ 428/425.9; 252/62.54; 360/134; 360/135; 360/136; 427/44; 427/128; 428/694; 428/522; 428/900
[58] Field of Search .................... 428/694, 900, 425.9, 428/522; 427/41, 44, 131, 128; 252/62.54; 360/134–136

[56] References Cited

U.S. PATENT DOCUMENTS

| 4,004,997 | 1/1977 | Tsukamoto | 428/900 |
| 4,343,831 | 8/1982 | Tsuji | 427/44 |
| 4,407,853 | 10/1983 | Okita | 427/44 |
| 4,428,974 | 1/1984 | Okita | 427/44 |
| 4,448,846 | 5/1984 | Chang | 428/694 |
| 4,448,848 | 5/1984 | Okita | 427/44 |
| 4,482,610 | 11/1984 | Okita | 428/694 |
| 4,518,656 | 5/1985 | Okita | 428/694 |

FOREIGN PATENT DOCUMENTS 128711 10/1982 Japan .

Primary Examiner—Ellis P. Robinson
Attorney, Agent, or Firm—Sughrue, Mion, Zinn, Macpeak & Seas

[57] ABSTRACT

A magnetic recording medium is described, comprising a support and a magnetic layer disposed thereon, said magnetic layer containing as its binder component a combination of at least one member of each of the following groups of compounds (1) to (3) that has been exposed to electron beams:

(1) vinyl chloride type resin, vinyl acetate type resin, vinyl chloride-vinyl acetate type resin, each containing from $5 \times 10^{-5}$ to $2 \times 10^{-3}$ equivalents of —$CO_2H$ groups per gram of copolymer, and nitrocellulose resin;

(2) urethane resins and urethane-acrylate oligomers; and (3) compounds containing an isocyanurate ring and at least two groups selected from acryloyl and methacryloyl groups.

21 Claims, No Drawings 4,621,027

MAGNETIC RECORDING MEDIUM

FIELD OF THE INVENTION

The present invention relates to magnetic recording media for video tape, audio tape, computer tape and other applications.

BACKGROUND OF THE INVENTION

The magnetic recording media in common use today typically comprise, as the binder component, thermoplastic resins such as vinyl chloride-vinyl acetate, vinyl chloride-vinylidene chloride, cellulose, acetal, urethane, acylonitrile-butadiene and other resins, either used alone or in combination. However, the magnetic layers thus formed are not sufficiently resistant to abrasion; thus the tape-head environments are readily fouled.

It is also a known technique to employ thermosetting resins such as melamine-formaldehyde and urea-formaldehyde resins or use a cross-linking chemical such as an isocyanate or epoxy compound in combination with thermoplastic resins. However, when a cross-linking binder is employed, the following disadvantages are inevitable. (1) The resin solution including a dispersion of magnetic particles has a poor aging stability, i.e. a short pot life, so that the magnetic tape is not as homogeneous as may be desired. (2) After coating and drying, the coated surface must be heat-treated to harden the coated film with the result that a long production time is required.

The above-described magnetic recording media comprising, as the binder component, vinyl chloride-vinyl acetate resin, urethane resin or isocyanate compound are described in, for example U.S. Pat. Nos. 4,431,712, 4,411,956 and 4,333,988.

To overcome these disadvantages, Japanese Patent Publication No. 12423/72, and Japanese Patent Publication (unexamined) Nos. 13639/72, 15104/72, 77433/75 and 25231/81 (corresponding to U.S. Pat. No. 4,443,490), for instance, teach techniques of using an acrylic acid ester oligomer and monomer system as the binder, and, after-drying, effecting a cure with electron beams. However, none of the above techniques provides a magnetic recording medium having sufficiently desirable magnetic properties (electromagnetic conversion characteristics) and running life characteristics.

The recent prolongation of tape recording times demands a thin support and improved dynamic properties in the magnetic layer. In the case of a video tape, for instance, the recent multi-functionality of video cassette recorders imposes rugged use conditions on the magnetic tape. Conventional techniques are incapable of providing a magnetic layer having dynamic properties commensurate with such requirements.

SUMMARY OF THE INVENTION

One object of the present invention is to provide a magnetic recording medium having excellent magnetic properties.

Another object of the present invention is to provide a magnetic recording medium with a magnetic layer having excellent dynamic properties.

A further object of the present invention is to provide a magnetic recording medium featuring a satisfactory pot life and homogeniety of the magnetic coating composition.

Still another object of the present invention is to provide a magnetic recording medium having excellent abrasion resistance.

It is a further object of the present invention to provide a magnetic recording medium which, in production, need not be heat-treated for hardening the coated surface.

The present inventors have endeavored to overcome the foregoing disadvantages of the known technology, involving the use of thermoplastic or thermosetting resins, technology comprising the addition of a chemical cross-linking agent, and technology using a binder to be hardened by electron beam cross-linking, and have now discovered the present invention.

Thus, the above-mentioned objects of the present invention are accomplished by providing a magnetic recording medium which comprises a base support and a magnetic layer disposed thereon, containing as its binder component a combination of at least one member of each of the following groups of compounds (1) through (3) and having been exposed to electron beams:

(1) at least one selected from the groups consisting of vinyl chloride type, vinyl acetate type and vinyl chloride-vinyl acetate type resins (hereinafter referred to collectively as vinyl resins, each containing $5 \times 10^{-5}$ to $2 \times 10^{-3}$ equivalents of $-CO_2H$ group per gram of copolymer) and nitrocellulose resin;

(2) at least one selected from the groups consisting of urethane resins and urethane-acrylate oligomers; and (3) compounds containing an isocyanurate ring and at least two groups selected from acryloyl and methacryloyl groups within the molecule.

The present invention is thus characterized in that as a magnetic layer comprising, as binders, (1) a vinyl resin and/or nitrocellulose resin, (2) a urethane resin and/or a urethane-acrylate oligomer, and (3) a compound having an isocyanurate ring and at least two groups selected from acryloyl and methacryloyl groups is exposed to electron beams, there occurs an unexpected effect of said resin components to result in significant improvements in magnetic properties as well as good running and endurance properties.

DETAILED DESCRIPTION OF THE INVENTION

As examples of the $-CO_2H$ group-containing vinyl resins, there may be mentioned such copolymers as vinyl chloride-vinyl acetate-maleic acid copolymer, vinyl chloride-vinyl acetate-acrylic acid copolymer, vinyl chloride-vinyl propionate-maleic acid copolymer, vinyl chloride-vinyl propionate-butenoic acid copolymer, vinylidene chloride-vinyl acetate-maleic acid copolymer, etc. The number of $-CO_2H$ groups is preferably in the range of from $5 \times 10^{-5}$ to $2 \times 10^{-3}$ equivalents, and more desirably in the range of from $3 \times 10^{-4}$ to $1 \times 10^{-3}$ equivalents, per gram of copolymer. Departing from the above range will result in a considerable loss of the magnetic properties of the magnetic recording medium. The nitrocellulose referred to above may preferably by cellulose dinitrate. The more preferred examples of compound (1) are vinyl chloride-vinyl propionate-maleic acid copolymer, vinyl chloride-vinyl acetate-maleic acid copolymer and nitrocellulose.

The urethane resin may be of polyether type and polyester type. The desirable number average molecular weight range is from 5,000 to 100,000, and preferably from 10,000 to 50,000. Departing from this range results in a decrease in the dispersibility of the magnetic powder.

The urethane-acrylate oligomer may be an oligomer having a number average molecular weight of from 500 to 100,000, and preferably from 1,000 to 30,000, which is obtainable by reacting a urethane prepolymer containing isocyanato groups in the terminal and/or side chain with a compound containing acryloyl or methacryloyl groups.

If the molecular weight of said oligomer is less than 500, the magnetic layer of the product magnetic recording medium will tend to be hard so that it tends to crack on flexure of the medium. Moreover, the curing and shrinking of the urethane-acrylate olygomer on electron beam bombardment may result in curling of the magnetic recording medium. On the other hand, if the molecular weight of the urethane-acrylate oligomer is in excess of 100,000, the solubility of the oligomer in the solvent will be low, with the result that both workability and the dispersibility of the magnetic powder will be sacrificed.

The urethane prepolymer having isocyanato groups in the terminal and/or side chain may be whichever of polyether and polyester urethanes. As examples of said compound containing acryloyl or methacryloyl groups, there may be mentioned hydroxy group-containing (metha)acrylates such as 2-hydroxyethyl (metha)acrylate, tetraethylene glycol mono(metha)acrylate, etc., as well as acrylic acid and methacrylic acid.

The more preferred examples of compound (2) are polyester type urethane resin and the acrylates thereof.

As examples of said compound containing an isocyanurate ring and two or more (metha)acryloyl groups within the molecule, there may be mentioned di(metha)acrylates or tri(metha)acrylates of polyols, e.g. tris-2-hydroxyethyl isocyanurate and the polyol obtainable by addition reaction of $\epsilon$-caprolactone with tris-2-hydroxyethyl isocyanurate. Referring to the latter polyol, the average number of molecules of $\epsilon$-caprolactone with respect to tris-2-hydroxyethyl isocyanurate may be in excess or less than the equivalent. The more preferred examples of compound (3) are tris-$\beta$-acryloyloxyethyl isocyanurate and bis-2-acryloyloxyethylhydroxyethyl isocyanulate.

In accordance with the present invention, at least one member of each of the above-mentioned groups of compounds (1) to (3) is selected and such three compounds are used as a mixture. If desired, the binder composition according to the present invention may be supplemented with an electron beam-polymerizable compound having one carbon-to-carbon unsaturated bond, as described in, for example *Kobounshi* (*High Polymer*), published by Society of High Polymer in Japan, vol. 11, pages 919 to 959 (1962).

The weight ratio of compound (1)/compound (2) is preferably in the range of from 20/80 to 90/10, and more desirably in the weight range of from 40/60 to 80/20. If the proportion of compound (1) is less than the above range or that of compound (2) is less than the range, the optimal desired durability cannot be obtained. The level of addition of compound (3) is preferably in the range of from 20 to 150 parts by weight and more desirably in the range of from 30 to 100 parts by weight based on the total weight of compounds (1) and (2). If the proportion of (3) is in excess of the above range, the dose of electron beam required for polymerization must be undesirably high, while only an inadequate degree of cross-linking will take place to result in undesirably low durability if the proportion of (3) is less than the above-mentioned range. The total amount of compounds (1), (2) and (3) added in the present invention is preferably about 50 to 10 parts by weight, more preferably 30 to 15 parts by weight, based on 100 parts by weight of the magnetic substances.

In the preparation of the magnetic recording medium and the irradiation with electron beams in the present invention, there may be used the known processes such as its preparation methods as described in, for example U.S. Pat. Nos. 3,240,621, 3,526,598, 3,728,262, 3,790,407, 3,836,393 and 4,337,288, and the electron beams-irradiation methods as described in, for example U.S. Pat. Nos. 4,343,831, 4,448,848, 4,407,853, 4,443,490 and 4,368,239.

The ferromagnetic powder employed in accordance with the present invention may be any of ferromagnetic iron oxide microfine powder, Co-doped ferromagnetic iron oxide microfine powder, ferromagnetic chromium dioxide microfine powder, ferromagnetic alloy microfine powder barium ferrite, etc. The effective acicular aspect ratio of ferromagnetic iron oxide or chromium dioxide is about 2/1 to 20/1 and preferably more than 5/1, and the average length is preferably in the range of about 0.2 to 2.0 $\mu$m. The ferromagnetic alloy powder should be such that its metal content is at least 75 weight percent and at least 80 weight percent of the metal content is ferromagnetic metal (Fe, Co, Ni, Fe—Co, Fe—Ni, Co—Ni or Fe—Co—Ni). The major diameter should be about 1.0 $\mu$m at the maximum. The organic solvent used for dispersing such ferromagnetic powder and coating the support with the magnetic coating composition is selected from among ketonic solvents such as acetone, methyl ethyl ketone, methyl isobutyl ketone, cyclohexanone, etc., esters such as methyl acetate, ethyl acetate, butyl acetate, ethyl lactate, glycol acetate monoethyl ether, etc., glycol ethers such as ether, glycol dimethyl ether, glycol monoethyl ether, dioxane, etc., aromatic hydrocarbons such as benzene, toluene, xylene, etc., and chlorinated hydrocarbons such as methylene chloride, ethylene chloride, carbon tetrachloride, chloroform, ethylene chlorohydrin, dichlorobenzene, etc.

The magnetic coating composition according to the present invention may be supplemented with a lubricating agent, mild abrasive, dispersing agent, antistatic agent, rust inhibitor, fungicide, pigment, etc. The lubricating agent may be a saturated or unsaturated higher fatty acid, fatty acid ester, higher fatty acid amide, higher alcohol, silicone oil, mineral or food oil, fluorine compound or the like, and may be added either in the course of preparation of the magnetic coating composition, after drying or smoothing treatment, or after electron beam hardening, or may be dissolved in an organic solvent and directly coated or sprayed on the surface of the magnetic layer.

The support material to which said magnetic coating composition is applied may be any of plastic materials such as polyesters (e.g., polyethylene terephthalate, polyethylene-2,6-naphthalate, etc.), polyolefins (e.g., polyethylene, polypropylene, etc.), cellulose derivatives (e.g., cellulose triacetate), polycarbonate, polyimide, polyamideimide, etc., or depending on the intended application, non-magnetic metals such as aluminum, copper, tin, zinc alloys containing such metals, plastics with a vapor deposition layer of aluminum or other metal, paper, paper coated or laminated with polyolefins, and so on. The thickness of the base support may be preferably about 5 to 100 μm.

The non-magnetic support may be in various forms, such as film, tape, sheet, disk, card, drum and so on, and suitable materials are chosen according to the intended use.

It should be understood that the reverse side of the support in the magnetic recording medium according to the present invention may be coated with a back-coating composition for preventing static electricity, print-through, or wow and flutter, improving the strength of the magnetic recording medium or matting the reverse side, etc.

The electron accelerator may be of the scanning, double scanning, curtain beam or broad curtain beam type. As regards electron beam parameters, the acceleration voltage is generally from 100 to 1000 kV and preferably from 150 to 300 kV, and the absorption beam dose is generally from 1.0 to 20 megarads, and preferably from 2 to 10 megarads. If the acceleration voltage is less than 100 kV, the energy penetration will be insufficient, while the use of a voltage over 1000 kV is uneconomical because the energy efficiency is low. If the absorption dose is less than 1.0 megarads, the curing reaction will not be thorough enough to impart desired strength to the magnetic layer. On the other hand, if the absorption dose is over 20 megarads, the efficiency of energy consumed for curing decreases, or heat is generated in the substrate, so that especially when the support is a plastic film, it tends to deform.

The following working and reference examples are further illustrative, but not limitative, of the present invention. In these examples, all parts are by weight.

EXAMPLE 1

| | |
|---|---|
| Y-Fe$_2$O$_3$ (Hc: 650 Oe, 0.5μ × 0.05μ) | 400 parts |
| Binder component { Vinyl chloride-vinyl acetate-maleic acid copolymer (CO$_2$H content: 1.5 × 10$^{-4}$ equivalents per gram of polymer) | 40 parts |
| Urethane resin (a condensation polymer of adipic acid, butanediol and tolylene diisocyanate having a number average molecular weight of 30,000) | 30 parts |
| Tris-2-acryloyloxyethyl isocyanurate | 30 parts |
| Lecithin | 4 parts |
| Stearic acid | 4 parts |
| Butyl stearate | 4 parts |
| Al$_2$O$_3$ | 4 parts |
| Carbon black | 10 parts |
| Methyl ethyl ketone | 1000 parts |

The above components were milled together in a ball mill for 50 hours to prepare a magnetic coating solution. Using a doctor blade, the resulting magnetic coating solution was coated on a 15 μ-thick polyethylene terephthalate support such that the dry thickness of the coated film was 5μ and the ferromagnetic powder was oriented with a coblat magnet. The solvent was then evaporated off at 100° C. for one minute and the surface was finished on a five-stage calender consisting of cotton-roll and mirror-surface roll (roll temperature: 60° C.).

The surface was then exposed to an electron beam at an acceleration voltage of 200 kV and a beam current of 10 mA until the absorption dose was 10 megarads. The product was designate as Sample No. 1.

EXAMPLES 2–4 AND REFERENCE EXAMPLES 1–3

The procedure of Example 1 was repeated, except that the binder compositions of Table 1 were employed and the resultant products were designated as Sample Nos. 2, 3, 4, 5, 6 and 7.

TABLE 1

| | Binder component | | Sample No. |
|---|---|---|---|
| Example 2 | Vinyl chlorine-vinyl acetate-maleic acid copolymer (same as Example 1) | 40 parts | 2 |
| | Urethane-acrylate oligomer (Toa Gosei K.K., Allonix M1100, number average m.w. 1100) | 40 parts | |
| | Tris-β-acryloyloxyethyl isocyanurates | 20 parts | |
| Example 3 | Nitrocellulose (Daicel, Ltd. RS1/2H) | 30 parts | 3 |
| | Urethane-acrylate oligomer [an acryloyl-terminated urethane-acrylate oligomer (m. wt. 25,000) prepated by reacting a OH-terminated urethane prepolymer of sebacic acid, butanediol and diphenylmethane diisocyanate with tolylene diisocyanate and 2-hydroxyethyl acrylate] | 50 parts | |
| | Bis-2-acryloyloxyethyl-hydroxyethyl isocyanulate | 20 parts | |
| Example 4 | Nitrocellulose (same as Example 3) | 30 parts | 4 |
| | Urethane resin (same as Example 1) | 50 parts | |
| | Triacrylate of a 1:3 adduct of tris-2-hydroxyethyl isocyanurate and ε-caprolactone | 20 parts | |
| Comparative Example 1 | Vinyl chloride-vinyl acetatemaleic acid copolymer (same as Example 1) | 40 parts | 5 |
| | Urethane-acrylate oligomer (same as Example 2) | 40 parts | |
| | Trimethylolpropane acrylate | 20 parts | |
| Comparative Example 2 | CO$_2$H-free vinyl chloride-vinyl acetate copolymer (UCC; VYHH) | 40 parts | 6 |
| | Urethane resin (same as Example 1) | 30 parts | |

TABLE 1-continued

| | Binder component | | Sample No. |
|---|---|---|---|
| Comparative Example 3 | Tris-2-acryloyloxyethyl isocyanurate | 30 parts | |
| | Nitrocellulose (same as Example 1) | 60 parts | 7 |
| | Tris-2-acryloyloxyethyl isocyanurate | 40 parts | |

For each of the samples prepared in Examples 1 to 4 and Comparative Examples 1 to 3, the coefficient of dynamic friction *1, still life time *2 and squareness ratio (residual magnetic flux density/maximum magnetic flux density) after 100 repeated runs using a video tape recorder were measured.

The results are shown in Table 2.

TABLE 2

| Sample No. | Squareness ratio | Coefficient of dynamic friction after repeated running*1 | Still life time*2 |
|---|---|---|---|
| 1 | 0.83 | 0.21 | ≧60 min. |
| 2 | 0.82 | 0.20 | ≧60 min. |
| 3 | 0.81 | 0.20 | ≧60 min. |
| 4 | 0.82 | 0.22 | ≧60 min. |
| 5 | 0.76 | 0.27 | 15 min. |
| 6 | 0.75 | 0.40 | 12 min. |
| 7 | 0.73 | 0.50 | 3 min. |

The data in Table 2 indicate the excellent magnetic properties and durability characteristics of the magnetic recording media according to the present invention.

The coefficient of dynamic friction and the still life time were determined in the following manner.

*1 With a VHS video tape recorder (Matsushita Electric Industrial Co., Ltd., McRoad 88 Model NV-8200), the tape tensions at the revolving cylinder were set at $T_1$ on the feed side and $T_2$ on the takeup side. The coefficient of friction ($\mu$) was defined by the following equation and the running tension was evaluated using the value of $\mu$ as an indicator.

$$T_2/T_1 = \exp(\mu\pi)$$

(determined at 40° C. and 65% RH)

Table 1 shows the data after 100 runs.

*2 With a VHS video tape recorder (Matsushita Electric Industrial Co., Ltd., Model NV8200), a given set of video signals was recorded on the video tape and the time till the sharpness of reproduced still images was lost was determined. This experiment was performed at 40° C. and 80% RH.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a support and a magnetic layer disposed thereon, said magnetic layer containing as its binder component a combination of at least one member of each of the following groups of compounds (1) to (3) that has been exposed to electron beams:
   (1) vinyl chloride type resin, vinyl acetate type resin, chloride-vinyl acetate type resin, each vinyl containing from $5 \times 10^{-5}$ to $2 \times 10^{-3}$ equivalents of —$CO_2H$ groups per gram of copolymer, and nitrocellulose resin;
   (2) urethane resins and urethane-acrylate oligomers; and
   (3) compounds containing an isocyanurate ring and at least groups selected from two acryloyl and methacryloyl groups within the molecule.

2. A magnetic recording medium according to claim 1, wherein each of said compounds of group (3) containing an isocyanurate ring and at least two (metha)acryloyl groups is a di(metha)acrylate or tri(metha)acrylate of tris-2-hydroxyethyl isocyanurate or of an adduct of tris-2-hydroxyethyl isocyanurate and $\epsilon$-caprolactone.

3. A magnetic recording medium according to claim 1, wherein said nitrocellulose is cellulose dinitrate.

4. A magnetic recording medium according to claim 1, wherein said urethane resin is a polyester urethane with a number average molecular weight of from 10,000 to 50,000.

5. A magnetic recording medium according to claim 1, wherein said urethane-acrylate oligomer is a reaction product of a urethane prepolymer containing isocyanato groups in at least one the terminal and side chain with a compound containing an acryloyl or methacryloyl group.

6. A magnetic recording medium according to claim 1, wherein said urethane-acrylate oligomer has a number average molecular weight of from 500 to 100,000.

7. A magnetic recording medium according to claim 1, wherein said urethane-acrylate oligomer has a number average molecular weight of from 1,000 to 30,000.

8. A magnetic recording medium according to claim 1, wherein said binder component further contains an electron beam-polymerizable compound containing carbon-carbon unsaturation.

9. A magnetic recording medium according to claim 1, wherein the compound selected from group (1) and the compound from group (2) are used in a weight ratio of from 20/80 to 90/10.

10. A magnetic recording medium according to claim 1, wherein the compound selected from group (1) and the compound from group (2) are used in a weight ratio from 40/60 to 80/20.

11. A magnetic recording medium according to claim 1, wherein the compound selected from group (3) is used in a proportion of from 20 to 150 parts by weight with respect to the combined weight of the compounds of groups (1) and (2).

12. A magnetic recording medium according to claim 1, wherein the compound selected from group (3) is used in a proportion of from 30 to 100 parts by weight with respect to the combined weight of the compounds of groups (1) and (2).

13. A magnetic recording medium according to claim 1, wherein said magnetic layer contains one or more members selected from the group consisting of lubricating agents, mild abrasives, dispersing agents, antistatic agents, rust inhibitors, fungicides and pigments.

14. A magnetic recording medium as in claim 1, wherein the vinyl chloride, vinyl acetate, or vinyl chloride-vinyl acetate resin contains from $3 \times 10^{-4}$ to $1 \times 10^{-3}$ equivalents per gram of copolymer.

15. A magnetic recording medium as in claim 1, wherein said urethane resin is a polyether or polyester urethane with a number average molecular weight of from 5,000 to 100,000; said urethane-acrylate oligomer has a number average molecular weight of from 500 to 100,000; the compound selected from group (1) and the compound selected from group (2) are used in a weight ratio of from 20/80 to 90/10; and the compound selected from group (3) is used in a proportion of from 20 to 150 parts by weight with respect to the combined weight of the compounds of groups (1) and (2).

16. A magnetic recording medium as in claim 1, wherein said urethane resin is a polyether or polyester urethane with a number average molecular weight of from 10,000 to 50,000; said urethane-acrylate oligomer has a number average molecular weight of from 1,000 to 30,000; the compound selected from group (1) and the compound selected from group (2) are used in a weight ratio of from 40/60 to 80/20; and the compound selected from group (3) is used in a proportion of from 30 to 100 parts by weight with respect to the combined weight of the compounds of groups (1) and (2).

17. A magnetic recording medium as claimed in claim 1, wherein the isocyanurate component is present in an amount of 3.55 wt % or more based on the total weight of the binders.

18. A magnetic recording medium as claimed in claim 1, wherein compound (1) is said vinyl chloride type resin.

19. A magnetic recording medium as claimed in claim 1, wherein compound (1) is said vinyl acetate type resin.

20. A magnetic recording medium as claimed in claim 1, wherein compound (1) is said vinyl chloride-vinyl acetate type resin.

21. A magnetic recording medium as claimed in claim 1, wherein compound (1) is said nitrocellulose.

* * * * *